March 18, 1952

A. E. BAAK 2,589,597

CONTROL APPARATUS

Filed Aug. 13, 1945

INVENTOR
ALBERT E. BAAK

BY George H. Fisher
ATTORNEY

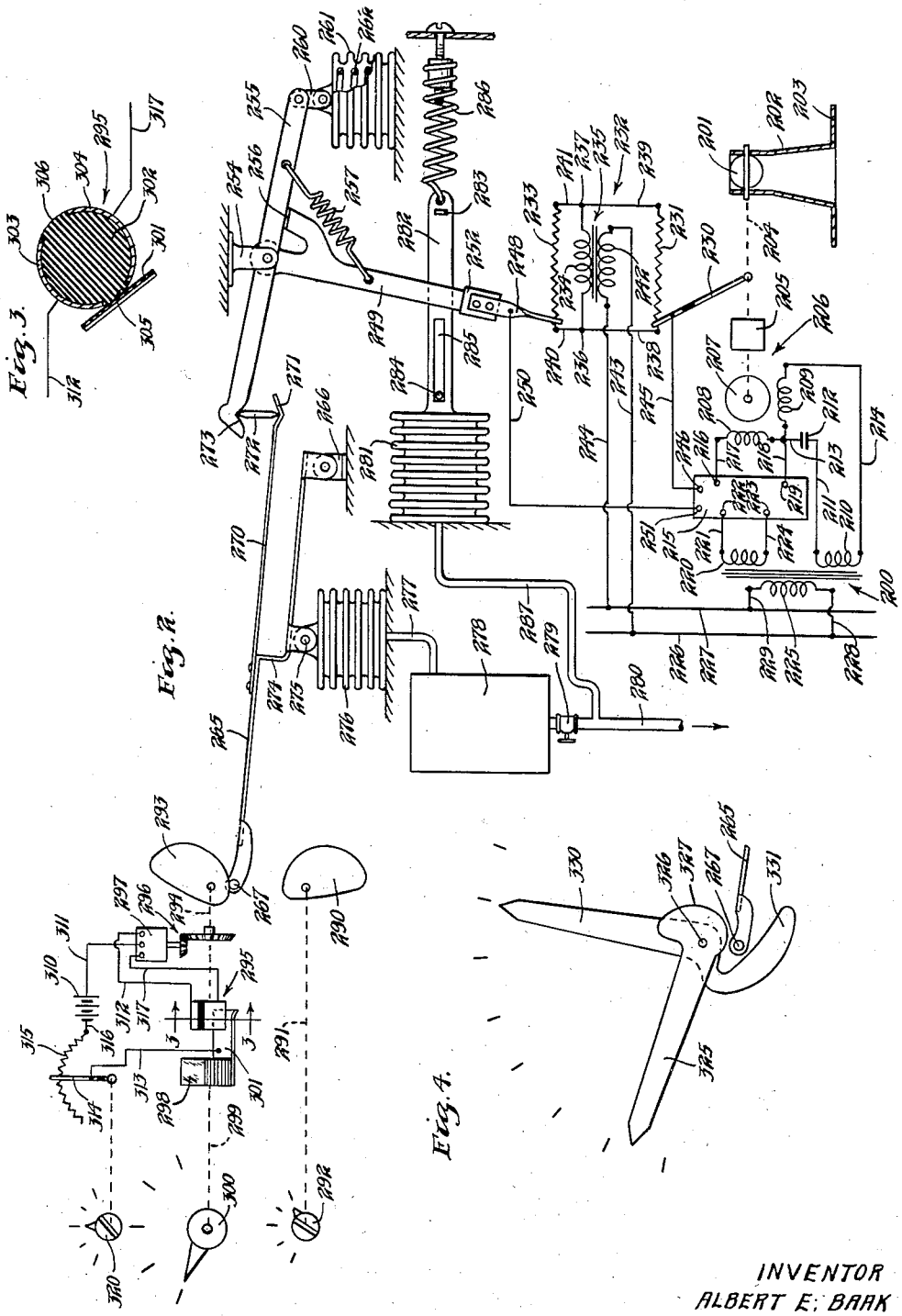

Patented Mar. 18, 1952

2,589,597

UNITED STATES PATENT OFFICE 2,589,597

CONTROL APPARATUS

Albert E. Baak, Los Angeles, Calif., assignor to Minneapolis-Honeywell Regulator Company, Minneapolis, Minn., a corporation of Delaware Application August 13, 1945, Serial No. 610,583

12 Claims. (Cl. 98—1.5)

The present invention relates to apparatus for controlling the air pressure within an aircraft cabin.

The cabins of aircraft which operate at high elevations are commonly pressurized to prevent discomfort and other undesirable physiological difficulties among the users of the aircraft. Generally, the cabins are pressurized by supplying adequate quantities of compressed air to the cabin and controlling the air outlet from the cabin by suitable valve means. Various systems of control for the outlet valve are used but none of the prior apparatus has proven entirely satisfactory.

In considering the effect of varying air pressures on humans, it is noted that the average person has a rather wide tolerance to the pressures imposed on him, but this tolerance depends not only on the value of the pressure involved, but also its rate of change. Because of this, it is not only necessary to control the absolute pressure within the cabin, but also the rate of change of the pressure in said cabin. To the casual observer, it would appear that these difficulties could be entirely overcome by merely maintaining the atmospheric pressure of the airport in the cabin at all times, so that there would be no change of pressure and, of course, no rate of change of pressure. In an aircraft, however, the necessity of weight reduction, the desire to fly at higher and higher elevations, and the difference in elevation of various airports at which the airplane may stop all combine to require changes in air pressure within the aircraft cabin.

The present invention meets the needs of a desirable cabin pressure control apparatus by permitting changes in pressure in the cabin proportionately to the changes in elevation of the aircraft up to the maximum pressure differential that can safely be withstood by the aircraft structure or to a limiting pressure for the human occupants.

It is thus an object of the present invention to provide apparatus for varying or maintaining the pressure in an aircraft cabin in proportion to the altitude of the airplane.

It is a further object to limit the change in absolute pressure within an aircraft cabin to a predetermined value.

It is a further object to limit the differential pressure within the aircraft cabin relative to the atmospheric pressure to a predetermined value.

Because of the need for weight reduction, low cost and dependability, it is also an object to provide relatively simple cabin pressure control apparatus wherein many of the components of same are simple, light, and commonly used in other aircraft apparatus.

It is an object to provide cabin pressure control apparatus which requires no manual attention on many flights and only a minimum of attention on other flights.

It is a further object to provide cabin pressure control apparatus wherein relatively few and simple specially constructed components are used.

It is a further object to provide cabin pressure control apparatus wherein the permissible rate of change of pressure may not exceed a value proportionate to the rate of change of elevation of the aircraft.

It is also an object to provide cabin pressure control apparatus wherein the low limit of pressure, in terms of altitude, may be readily adjusted and may be adjusted at a timed rate.

It is a further object to provide means for controlling cabin pressure wherein the controlling functions may be correlated by either mechanical or electrical means.

These and other objects will become apparent upon a study of the following specification and drawings in which Figure 1 shows schematically the present cabin pressure control apparatus wherein the control components are electrically correlated.

Figure 2 is a view similar to Figure 1, but wherein the control components are mechanically correlated.

Figure 3 is a sectional view of the chaser switch taken on line 3—3 of Figure 2.

Figure 4 is an elevational view of modified limit adjusting means usable in the apparatus of Figure 2.

Figure 1:
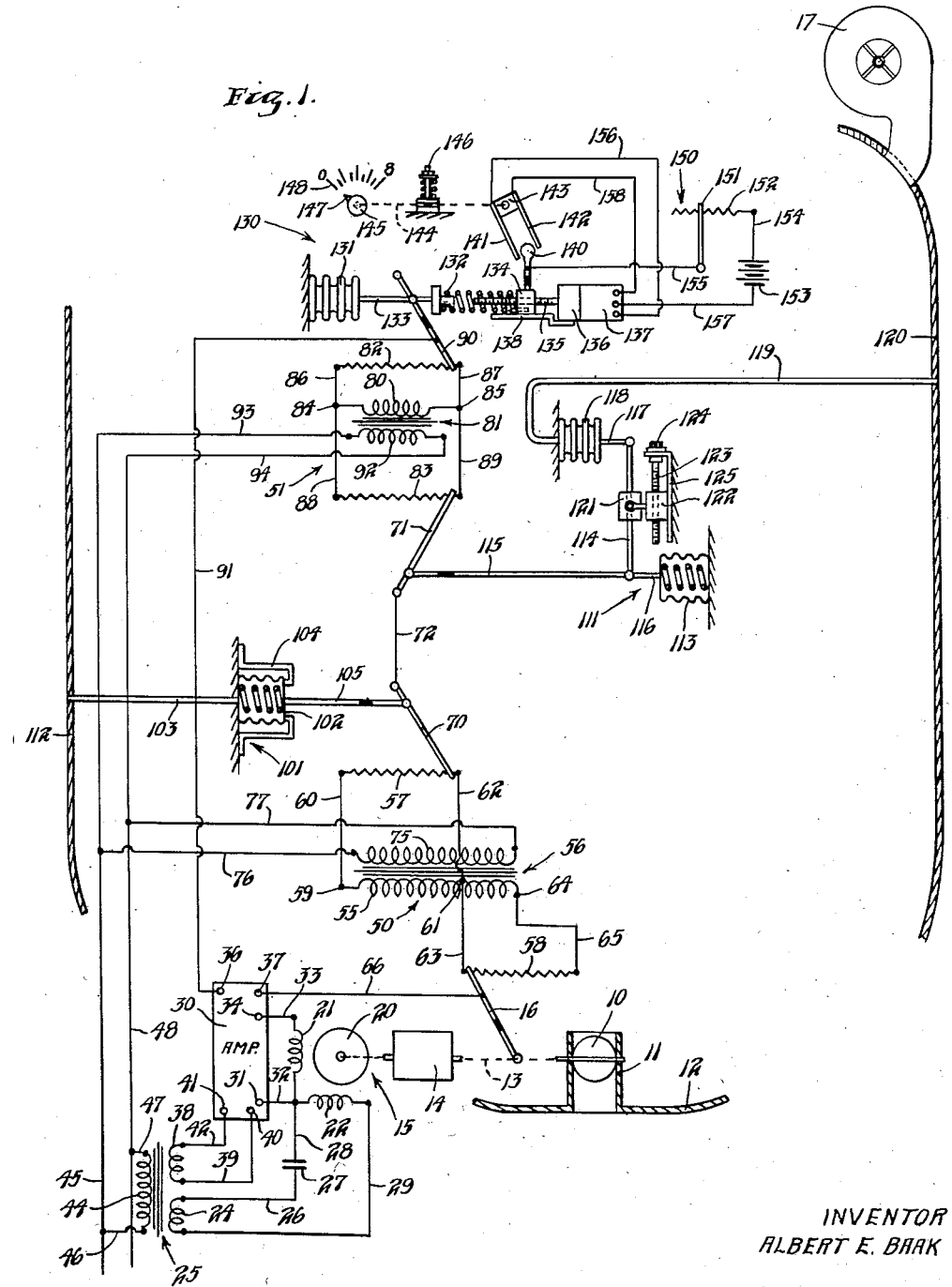

In the description of the present invention, it will be assumed that the aircraft cabin in question is adequately supplied with air, by means such as a compressor 17, under a pressure at least as high as that desired in the cabin. The control of the pressure in the cabin is then effected by controlling the air outlet from the cabin. While means may be employed to regulate the inflow of the air, such means forms no part of the present invention and therefore has not been shown.

In Figure 1, valve 10 controls airflow through outlet 11 mounted in wall 12 of the airplane. While valve 10 is shown as a single butterfly type, it may be of any suitable form capable of power actuation. Closing valve 10 increases cabin pressure, or increases the differential of cabin pressure over atmospheric pressure, whereas opening valve 10 reduces cabin pressure, or reduces the said differential pressure.

Valve 10 is driven by shaft 13 which in turn is driven through reduction gearing 14 by motor 15. In addition, potentiometer wiper 16 is positioned by shaft 13 in accordance with the positioning of said valve 10.

Motor 15 is of the two phase reversible sort including armature 20 and field windings 21 and 22. This type of motor requires for operation a difference in phase of the current supplied its windings, and the direction of rotation of the armature, such as 20, depends upon whether the current supplied winding 21 lags or leads the current supplied winding 22. Winding 22 of motor 15 is energized by the circuit: secondary winding 24 of transformer 25, wire 26, capacitor 27, wire 28, winding 22 and wire 29, back to secondary winding 24. As no means are provided for varying the phase of the current supplied winding 22, this winding is known as the fixed phase winding. Winding 21 is energized by the output of amplifier 30, the circuit being: terminal 31, wire 32, winding 21, wire 33, and terminal 34.

As above noted, the phase of the current supplied winding 21, and thus the phase of the output current of amplifier 30, determines whether or not the motor will operate and the direction of rotation.

Amplifier 30 is of any suitable sort which will maintain the same phase relation in its output current as exists in the input current. As an example of a highly successful amplifier of this sort, reference is made to that disclosed in the copending application of Albert P. Upton, Serial No. 437,561, filed April 3, 1942, now Patent Number 2,423,534, issued July 8, 1947. Amplifier 30 includes signal input terminals 36 and 37 and the operating current for the amplifier is furnished by the circuit: secondary winding 38 of transformer 25, wire 39, terminal 40, terminal 41, wire 42, and secondary winding 38.

Primary winding 44 of transformer 25 is energized by the circuit: line wire 45, wire 46, winding 44, wire 47, and line wire 48.

The phase of the signal current impressed on terminals 36 and 37 of amplifier 30 depends on the condition of balance of a compound electrical network including individual networks 50 and 51. Network 50 receives its energizing current from secondary winding 55 of transformer 56 and includes resistors 57 and 58. Resistor 57 is connected to terminal 59 of winding 55 by wire 60 and to intermediate tap 61 by wire 62. Resistor 58 is connected to tap 61 of winding 55 by wire 63 and to terminal 64 by wire 65. Potentiometer wiper 16 coacts with resistor 58 and is connected to terminal 37 of amplifier 30 by wire 66.

Potentiometer wiper 70 coacts with resistor 57 and is connected to wiper 71 of network 51 by wire 72.

Primary winding 75 of transformer 56 is connected to line wires 45 and 48 by wires 76 and 77, respectively.

Network 51 is supplied current by secondary winding 80 of transformer 81 and includes resistors 82 and 83. Resistor 82 is connected to terminals 84 and 85 of winding 80 by wires 86 and 87, respectively, while resistor 83 is connected to said terminals 84 and 85 by wires 88 and 89, respectively. The aforementioned potentiometer wiper 71 coacts with resistor 83 while potentiometer wipe 90 coacts in a similar fashion with resistor 82. Wiper 90 is connected to terminal 36 of amplifier 30 by wire 91 thus completing the compound network.

Primary winding 92 of transformer 81 is connected to line wires 45 and 48 by wires 93 and 94, respectively, it being noted that the transformers are similarly connected so that networks 50 and 51 will be energized by currents of like phase.

Wiper 70 is adjusted over resistor 57 by a differential pressure responsive device 101 whenever the cabin pressure exceeds the atmospheric pressure by a predetermined value. This device safeguards the aircraft structure by limiting, in a manner to be shown, the amount of differential pressure that can be imposed on said structure. Device 101 comprises a spring expanded bellows 102, the interior of which is connected to the atmosphere by tube 103 extending through cabin wall portion 112. The expansion of bellows 102 is limited by stop means 104 and the motion of bellows 102 is communicated to wiper 70 by link means 105.

Ratio controller 111 operates wiper 71 over resistor 83 to serve as the effective regulating device for the cabin pressure. Controller 111 comprises a spring expanded evacuated bellows 113 for responding to the absolute pressure in the cabin, bellows 113 being connected to pivoted lever 114 and to link 115 by link 116. At the other end of lever 114, link 117 connects said lever 114 to bellows 118. Bellows 118 is connected to the atmosphere by tube 119 extending through wall portion 120 of the aircraft cabin. Bellows 118 thus responds to the difference between cabin pressure and atmospheric pressure. Lever 114 is carried by a longitudinally shiftable block means 121 pivotally mounted on a threaded member 122. Member 122 is longitudinally adjusted by screw means 123, having an adjusting knob 124, and is guided by means 125. By manipulating knob 124, means 122 and member 121 is adjusted along lever 114, thus shifting its pivot point and varying the relative effectiveness of bellows 113 and 118 for adjusting wiper 71. For the purpose of this description, it will be assumed that the pivot point for lever 114 is midway between the ends so that bellows 118 and 113 are equally effective in adjusting wiper 71.

Since bellows 113 responds to the absolute pressure in the cabin, it, acting alone would adjust wiper 71 in a manner to hold the cabin pressure constant by moving said wiper to the left with any decrease in the cabin pressure. Bellows 118, as before noted, responds to the different atmospheric and cabin pressures and, acting alone, would adjust wiper 71 in a manner to make the cabin pressure correspond to the atmospheric pressure. Thus, a decrease in atmospheric pressure would cause movement of wiper 71 to the right to decrease cabin pressure. The manner in which wiper 71 adjusts the cabin pressure will become apparent in the description of operation of the present apparatus which shortly follows.

Because the aircraft may use airports of different elevations, it is necessary that the low limit, in terms of altitude, or the reference pressure, must be adjustable. To perform this function, device 130 is provided for adjusting wiper 90. Device 130 comprises an evacuated bellows 131 which is expanded by an adjustable tension spring 132 acting through member 133, said member being secured at one end to said bellows and attached at the other end to one end of said spring 132. Member 133 is also pivotally secured to wiper 90 so that any movement of said member causes movement of said wiper over resistor 82. The other end of spring 132 is attached to a threaded member 134 which may be longitudinally adjusted by threaded shaft 135. Threaded shaft 135 is driven through reduction gearing 136 by reversible motor means 137, and member 134 is prevented from rotating with said shaft by guide means 138.

The energization of motor 137 is controlled by a chaser switch construction including a contact member 140 carried by member 134 which coacts with flexible and resilient switch blades 141 and 142. Blades 141 and 142 are insulated from each other by and mounted on block 143 which in turn is mounted on shaft 144. Blades 141 and 142 are sufficiently spaced and are so arranged that they straddle and may each be slightly spaced from contact member 140 and the blades are each sufficiently flexible that block 143 may be considerably rotated even though contact member 140 has not moved. Obviously, any rotation of block 143 brings one or the other of the blades in contact with member 140. As before noted, block 143 is mounted on shaft 144. Shaft 144 is rotatably adjusted by knob 145 and the shaft is maintained in adjusted positions by suitable friction bearing means such as 146, it being necessary that the frictional force of the bearings or the like exceeds the rotative force on the shaft that may arise from the deflection of one of the switch blades of the chaser switch. Knob 145 includes pointer 147 for use with a suitably graduated scale 148.

The energizing circuits for motor 137 include a speed controlling rheostat 150 having a wiper 151 and resistor 152. When a circuit is completed through the blade 141, shaft 135 is driven in a direction to cause member 134 to move to the right, and tighten spring 132, whereas the circuit made through blade 142 causes shaft 135 to be driven in a direction to move 134 to the left and loosen spring 132. Rheostat 150 controls the speed of the motor and thus the rate of change of the spring tension. Because spring 132, bellows 131, member 133, and wiper 90 are all connected, the position of wiper 90 is dependent on the position of bellows 131 which in turn depends on the cabin pressure and the tension of spring 132. Bellows 131 is expanded to its maximum under atmospheric pressure conditions only by maximum tension on said spring. Either an increase in pressure on the bellows or decrease in tension of the spring will cause wiper 90 to move to the left whereas an increase in spring tension or a decrease in cabin pressure will tend to move said wiper to the right. The operation of device 130 and its part in the control of cabin pressure will be made more clear in the following description of operation.

While the various components and their relation has been rather specifically set forth in the preceding description, it is noted that many substitutions and equivalents are apparent and are contemplated in the invention.

*Operation of Figure 1*

In considering the operation of the present apparatus, the present description can be made more concrete by making certain assumptions. First, a good starting place for the description will be that in which the airplane is at rest on an airfield at sea level elevation. At sea level, and with no cabin pressurizing needed, it is obvious that the differential pressure is zero, hence bellows 102 of differential pressure responsive means 101 is expanded against its stops. This device may be considered as being of such strength and so adjusted that it will move wiper 70 to the left across resistor 57 only when the differential pressure imposed on bellows 102 exceeds about 10″ Hg. With a differential pressure of less than 10″ of Hg, imposed on bellows 102, wiper 70 remains at its extreme right position.

With zero elevation of the aircraft and maximum absolute pressure imposed on bellows 113, and with no differential pressure imposed on bellows 118, wiper 71 is adjusted to the extreme right of resistor 83. Any increase in altitude, or decrease in absolute pressure on bellows 113 will cause the same to expand and to move wiper 71 to the left, as previously explained. However, the motion will be modified by the increase in differential pressure occasioned as the aircraft rises and pressure in the cabin increased relative to atmospheric changes in pressure. It has previously been noted that knob 124 is so adjusted that bellows 118 will be equally effective in controlling the motion of wiper 71 as will the bellows 113, hence apparatus 111 will control wiper 71 in a manner to hold the cabin pressure at a value substantially mid-way between atmospheric pressure at sea level and atmospheric pressure at the elevation in question.

Rheostat 150 is so adjusted that motor 137 cannot operate wiper 90 across resistor 82 at a rate to vary cabin pressure at more than 300 feet per minute. With sea level pressure, and spring 132 at maximum tension due to knob 145 being adjusted to zero, wiper 90 is at the extreme right of resistor 82. Should knob 145 be rotated clockwise, and spring 132 thereby loosened, wiper 90 would then move to the left across resistor 82 due to the cabin pressure collapsing bellows 131.

To more readily understand the compound network, it may be assumed that secondary 80 of transformer 81 imposes 30 volts across resistors 82 and 83. Likewise, 30 volts are impressed across resistor 57 and 15 volts across resistor 58. In addition, it may be considered that the polarity of networks 50 and 51 is such that the left of each of said networks is negative and the right-hand of said networks is positive in polarity.

While it is obvious that the networks are energized by alternating current, it is noted that a current which is at one instant negative in potential is, 180 electrical degrees later, positive in potential. It is apparent that a shift in phase may be interpreted at a specified instant as a variation in the polarity of the voltage. Considering the phase relation of the compound network in terms of potential, it follows that a difference in potential across terminals 36 and 37 of amplifier 30 will cause operation of motor 15; if terminal 36 be positive relative to terminal 37 during an assumed half cycle, motor 15 operates in a direction to close valve 10 whereas, if terminal 37 be positive relative to terminal 36 during the same half cycle, motor 15 operates valve 10 in an opening direction. Opening valve 10 will tend to decrease cabin pressure, relative to atmospheric pressure, and closing said valve will tend to increase cabin pressure, relative to atmospheric pressure.

Starting with wiper 16, and considering the balance of the network in the apparatus as shown, it is noted that wiper 16 is connected through to wiper 70 by wires 63 and 62, hence they are at the same potential. Further, wiper 70 is connected through wire 72 to wiper 71 which in turn is connected through wiper 90 by wires 89 and 87. Therefore, wipers 16 and 90 are at a like potential; hence, terminals 37 and 36, connected to said wipers, respectively, are at like potential, there is no signal impressed on amplifier 30 and motor 15 does not operate.

If the airplane should now leave the field and climb at a rate of, for instance, 600 F. P. M., the air pressure in the cabin will tend to decrease at the same rate as the outside atmospheric pressure due to valve 10 being open. However, as the cabin pressure tends to decrease, bellows 113 expands and moves wiper 71 to the left. With each of the other wipers in their previous locations and with wiper 71 moved 2 bolts, for instance to the left across resistor 83, wiper 90 then becomes 2 volts positive relative to wiper 16 during the half-cycle being considered, terminal 36 becomes 2 volts positive relative to terminal 37 and motor 15 operates to close valve 10. The closing movement of valve 10 also moves follow-up potentiometer wiper 16 to the right across resistor 58, this movement continuing until wiper 16 has moved 2 volts to the right across said resistor. Then, wipers 70 and 71 will be 2 volts negative relative to wiper 16 and wiper 90 remains 2 volts positive relative to wiper 71. The sum of the unbalance equals zero and again there is no potential across terminals 36 and 37 of the amplifier. The motor is stopped. As the valve is moved toward closed position, pressure increases in the cabin in a manner to restore the previous value and to cause retraction of bellows 113. In addition, however, increase in cabin pressure likewise causes an increase in differential pressure between the cabin and the outside, hence bellows 118 tends to contract and to modify the action of bellows 113 in moving wiper 71. Actually then, as valve 10 starts to influence the cabin pressure, wiper 71 is moved by the joint action of bellows 113 and 118, so that valve 10 is controlled by the joint effect of cabin pressure and differential pressure. This will be seen by noting that there is no extension of bellows 113, and no force exerted by the same when cabin pressure of an aircraft at a high altitude is at a sea level value whereas, at this same value of cabin pressure, the force due to bellows 118 is at a maximum. If the cabin pressure should be changed to correspond to the altitude of the aircraft, then bellows 113 would be forced by its internal spring to expand a predetermined amount and no force would be exerted by bellows 118. However, expansion of bellows 113, and the consequent movement of wiper 71, would tend to restore sea level cabin pressure. Therefore, due to the connection of the two bellows by lever 114, and the joint effect of bellows 113 and 118, wiper 71 is moved across resistor 83 only half as far as it would if bellows 113 alone were controlling. Therefore, when the aircraft reaches an elevation of 1,200 feet, for instance, the cabin pressure will be controlled to a value equivalent to 600 feet of elevation. So far, there has been no effect on the other control devices because the differential pressures involved are still far below those necessary to cause operation of device 101 and a decrease in absolute cabin pressure only tends to move wiper 90 to the right but it is already at its extreme right position. As the aircraft continues to rise, the differential pressure tends to increase; therefore valve 10 is continually moved to a more closed position even though the absolute pressure in the cabin is decreasing. Therefore, wiper 71 gradually shifts to the left across resistor 83 sufficiently to cause sufficient valve closing movement to maintain the desired condition of a cabin pressure one-half that, in the terms of altitude, of the elevation of the aircraft. If, at a particular elevation, it should require valve 10 to be half closed to maintain the desired cabin pressure, and the half-closed valve position meant that wiper 16 would be 7½ volts positive relative to wiper 70, then wiper 71 would have to move ¼ the distance across resistor 83 to the left so that wiper 71 might be 7½ volts negative relative to wiper 90 to balance out the network.

If it be assumed that an 8,000 foot cabin, or pressure corresponding thereto, is a maximum for the passengers, and it is desired to fly the airplane at an elevation exceeding 16,000 feet, this can be done by adjusting knob 124. Instead of maintaining a cabin pressure which is ½, in terms of altitude, of the elevation of the airplane, apparatus 111 may be adjusted to maintain a cabin pressure of ⅓, or other fraction, of that of the elevation of the airplane by adjusting knob 124 to move the pivot block 121 along lever 114 and thus vary the effect of bellows 118. Thus, bellows 113 is made more effective in maintaining the absolute pressure of the cabin, with the above noted ⅓ adjustment. However, because the absolute pressure at an 8,000 foot elevation is approximately 22.2 inches of Hg, and differential pressure responsive device 101 moves wiper 70 to the left upon a differential pressure in excess of 10 inches of Hg, then the desired maximum differential of pressure tends to be exceeded as the aircraft rises above 23,000 feet, corresponding to a 12.2 in. of Hg, pressure. This causes movement of slider 70 to the left. Movement of wiper 70 to the left makes it negative relative to wiper 16 and decreases the positive signal to terminal 36. Because wiper 16 is then more positive relative to terminal 36, than it was previously, or, assuming that the apparatus was in a state of equilibrium when wiper 70 moves to the left, wiper 16 and terminal 37 then become positive relative to terminal 36 and motor 15 is operated to open the valve 10. Opening valve 10 decreases the cabin pressure and therefore decreases the differential pressure, hence device 101 is effective in limiting the differential pressure that can be imposed on the aircraft structure.

If the aircraft should now descend to the field from which it took off, no adjustment of the apparatus is necessary, the absolute cabin pressure tends to increase due to the lessened differential across valve 10, and bellows 113 is thus forced to contract and move wiper 71 to the right to open valve 10.

If the aircraft is to land at a field having an elevation different from that where it took off, knob 145 is adjusted so that pointer 147 indicates the elevation of the new field. If this field be at an elevation of 4,000 feet, for instance, knob 145 is rotated so that pointer 147 is vertical and block 143 is rotated in a similar fashion. Blade 141 will also be vertical but blade 142 will be in contact with member 140 and considerably deflected. However, when blade 142 comes in contact with member 140, a circuit is closed through motor 137, as follows: battery 153, resistor 152, wiper 151, wire 155, contact member 140, blade 142, wire 156, motor 137, and wire 157 back to battery 153. This causes motor 137 to drive member 134 to the left, which motion will continue until blade 142 is no longer deflected and member 140 moves out of contact with it and breaks the circuit. The motor is thus deenergized and stopped. However, movement of 134 to the left loosens spring 132 and permits wiper 90 to be shifted to the left. As wiper 90 moves to the left, it becomes more negative than it previously was, or otherwise stated, wiper 16 and terminal 37 of amplifier 38 become more positive relative to terminal 36. As before noted, when terminal 37 becomes positive relative to terminal 36, motor 15 is operated in a valve opening direction. Opening of valve 10 permits the absolute cabin pressure to decrease. While a decrease in pressure in the cabin is reflected in a movement of wiper 71 to the left due to the expansion of bellows 113, it is noted that wiper 71 must move to the left of wiper 90 before terminal 36 will normally become positive relative to terminal 37 and again cause a closing movement of the valve. Wiper 90 thus forms a reference point determining the high limit of absolute pressure, or the low limit of pressure in terms of altitude pressure at which device 111 will control. Because movement of wiper 90 to the left is immediately reflected in a reduction of absolute cabin pressure, it is important that the movement of wiper 90 should not exceed a desired rate. As before pointed out, the speed of motor 137 is controlled by rheostat 150 so that the spring tension of 132 can be varied at a desired rate. In addition, it is noted that even if spring 132 be sufficiently loosened so that wiper 90 will be at the mid-point of resistor 82 at a cabin pressure corresponding to a 4,000 foot elevation, at an elevation in excess of 4,000 feet, wiper 90 will lie to the right of the mid-point because the positioning of wiper 90 is due to the joint effect of spring 132 and bellows 131. Wiper 90 will move to its mid-position as the absolute cabin pressure increases and causes contraction of bellows 131.

Without the adjustment of wiper 90 to compensate for the new elevation of the air field at which the landing is to take place, it is noted that the cabin pressure would tend to correspond to that of a 2,000 foot elevation when the plane is landing at 4,000 feet. While this excess of pressure, absolute, would be quickly dissipated when the compressor for the cabin was shut off due to the air flowing back through the same, the change in pressure would be at too rapid a rate, and therefore undesirable. Under other flight conditions, such as when the aircraft leaves a field at zero elevation, for instance, and rises to an elevation of about 8,000 feet, and maintains this elevation for the duration of the flight and then lands at a field having an elevation of 5,000 feet, it is noted that complications tend to arise. While the aircraft is rising to an elevation of 8,000 feet, the cabin pressure is changing to a value corresponding to 4,000 feet, and then when the aircraft goes down to the 5,000 foot elevation field, the cabin pressure tends to go to a value corresponding to 2,500 feet elevation. Here again, on landing, the excess pressure could be relieved by blowing back through the compressor when the compressor or like is stopped. However, by adjusting device 130 prior to the descent to the landing field, valve 10 will be driven toward open position and the pressure in the cabin, in terms of altitude, increased so that the cabin pressure will correspond to that of the field when the landing actually takes place. Because of the timed rate of adjustment of wiper 90, it is noted that knob 145 must be adjusted to the elevation of the field sufficiently long before the landing is to be attempted so that there will be time to properly adjust wiper 90. In other words, if wiper 90 is to be adjusted at a rate to change cabin pressure at 300 F. P. M. and knob 145 is adjusted from zero to 5,000 feet, then knob 145 must be adjusted approximately 17 minutes before the landing is to be effected.

When knob 145 is again turned to zero and blade 141 is brought into engagement with 140, motor 137 is energized to move 134 to the right by the following circuit: battery 153, wire 154, resistor 152, wiper 151, wire 155, contact member 149, blade 141, wire 156, motor 137, and wire 157 to battery 153. Member 134 will move to the right until contact member 140 moves out of engagemnet with blade 141, as shown.

The present apparatus is thus seen to be fully effective in varying aircraft cabin pressure at a proportionate rate to change in elevation of the aircraft. In addition, overstressing of the aircraft structure is prevented by simple differential pressure responsive means. Further, the cabin pressure can be adjuted from any particular value to a desired value at a timed rate. On many of the flights that an aircraft makes, no adjustment whatever would be required on this control apparatus, and on other flights, where landing is to be made at a different elevation from the field of the take-off, only a single knob need be adjusted. In addition, if flights at excessive elevations are made, an adjustment of knob 124 might be necessary.

*Figure 2*

Figure 2 shows apparatus which will function somewhat similarly to that of Figure 1, but wherein the various components are mechanically correlated instead of electrically as in Figure 1. In Figure 2, valve member 201 controls airflow through air outlet 202 extending through cabin wall 203. Valve 201 is adjusted by shaft 204 driven through reduction gearing 205 by motor means 206. Motor means 206 is of a two-phase type similar to that described in Figure 1 and comprises an armature 207, a field winding 208, and another field winding 209. Winding 209 is energized from secondary 210 of transformer 200 by the circuit: secondary winding 210, wire 211, condenser 212, wire 213, winding 209, and wire 214 back to secondary winding 210. Winding 208 is energized from the output of amplifier 215 by the circuit: output terminal 216, wire 217, winding 208, wire 218, and terminal 219.

Amplifier 215 is of a type which maintains the phase relation of its output current the same as the phase relation of the signal current impressed on its input terminals. Thus this amplifier is similar to 30 in Figure 1. Amplifier 215 receives an energizing current from transformer secondary winding 220 by the circuit: winding 220, wire 221, terminal 222, terminal 223, wire 224, and secondary winding 212. Primary winding 225 of transformer 200 is energized from line wires 226 and 227 by wires 228 and 229, respectively.

In addition to valve 201 being operated by shaft 204, potentiometer wiper 230 is driven by said shaft across resistor 231 of network 232. Network 232 also includes resistor 233, and is energized by secondary winding 234 of transformer 235. Resistor 231 is connected to output terminals 236 and 237 of winding 234 by wires 238 and 239, respectively. Resistor 233 is connected to terminals 236 and 237 by wires 240 and 241, respectively. Primary winding 242 of transformer 235 is energized by the circuit: line wire 226, wire 243, primary winding 242, wire 244, and line wire 227. Wiper 230, which sweeps over resistor 231 is connected by wire 245 to signal input terminal 246 of amplifier 215. Wiper portion 248 of lever member 249 is adjustable over resistor 233 and is connected by wire 250 to input terminal 251 of said amplifier. Wiper portion 248 is electrically insulated from lever portion 249 by insulation 252.

Lever 249 is pivotally mounted on support 254 and is connected by strain release means to lever 255 also pivotally mounted on said support member. Lever member 249 includes an angularly extending abutment member 256 for engaging lever 255 for limiting the counter-clockwise rotation of lever 249 relative to lever 255. Projecting member 256 is held in engagement with lever 255 by tension spring means 257 extending between levers 249 and 255. Levers 249 and 255 thus tend to rotate together although lever member 249 can rotate clockwise relative to 255 if the force of spring 257 is overcome. The right end of lever 255 is connected by link means 260 to absolute pressure responsive bellows 261. Bellows 261 is evacuated and is prevented from collapsing by a spring 262. An expansion of bellows 261 rotates levers 255 and 249 counterclockwise and moves wiper portion 248 to the right across resistor 233.

Counterclockwise rotation of lever 255 is opposed by means including pivoted lever means 265. Lever means 265 is pivoted at its right end to support means 266 and carries a transversely projecting pin 267 at its left end. Lever 265 coacts with lever 255 through a relatively long spring blade 270 having a socket portion 271 for engagement with thrust member 272. Thrust member 272 engages a socket portion 273 in the left end of lever 255. Spring blade 270 is long enough to overhang the right end of lever 265 so that movement downward of the left end of lever 265 results in a tendency for socket portion 271 of lever 270 to move upwardly. Deflection of spring 270 relative to lever member 265 is permitted by off-setting one portion of lever 265 relative to the other, as at 274, or by mounting said spring 270 on a block member carried by lever 265, not shown. At an intermediate point 275 of said lever 265, differential pressure responsive bellows 276 is pivotally attached.

Bellows 276 is exposed to cabin pressure on one side, and the inside of said bellows connects through tube 277 to receptacle 278, which in turn communicates with the outside temperature through adjustable restrictor means 279 and tube 280. Bellows 276 is in a normally expanded position due to its own spring rate but if desired, a suitable spring may be placed inside the bellows to keep it in a desired expanded position at minimum differential. However, as the differential of pressure increases, such as when the aircraft rises into the air and pressure is built up in the cabin, bellows 276 tends to contract and rotate lever 265 counterclockwise. Due to the aforementioned overhang of spring 270, socket 271 tends to move upwardly and thereby imposes a force on lever 255 tending to rotate it clockwise, or against any expansive forces of bellows 261. Or, in terms of movement of wiper 248, contraction of bellows 276 tends to move said wiper 248 to the left across resistor 233. Bellows 276 and 261 are preferably proportioned so that they are about equally effective in causing motion of lever 249.

In addition to bellows 261 and 276 determining the movement of levers 249 and 255, differential pressure responsive bellows 281 may also influence the position of lever 249. Bellows 281 operates a link member 282 which has a transversely extending abutment 283 adapted to engage lever 249 under circumstances to be related. The motion of member 282 is limited by a fixed pin 284 coacting with slot 285 in said member 282. Lever member 282 is normally in its extreme right position due to the force of adjustable spring means 286. Bellows 281 is connected by tube 287 to tube 280, and therefore communicates with the outside atmosphere. As the outer side of bellows 281 is exposed to cabin presusre, bellows 281 responds to the differential between cabin pressure and atmospheric pressure. When this differential reaches a limiting value, such as 10 in. Hg, bellows 281 contracts and moves member 282 to the left against the force of spring 286. When the movement to the left of member 282 is sufficient that abutment portion 283 engages lever 249, lever 249 is also moved to the left to cause an opening movement of the outlet valve. Lever 249 is permitted to move to the left even though lever 255 does not move due to the force of bellows 281 overcoming strain release spring 257.

Adjustable stop means are provided for coaction with transversely extending pin 267 of lever 265 to provide upper and lower limits of cabin pressure, in terms of altitude. For the upper limit, cam 290 is driven through shaft 291 by adjustment means 292 to provide a variable stop limiting the downward movement, or the counterclockwise movement of lever 265. Limiting the counterclockwise movement of lever 265 thus limits the force that can be exerted by lever 270 on lever 255 so that, upon pin 267 engaging cam 290, control of the apparatus tends to shift to absolute pressure responsive bellows 261. In the position shown, cam 290 is rotated by 292 to a maximum pressure limit, in terms of altitude. Rotation of 292 to the left or counterclockwise limits the deflection of lever 265 to a lesser amount and imposes a lower limit on cabin pressure, in terms of altitude. Adjusting means 292 is shown as a screwdriver adjustment device, but if desired this may be an ordinary thumb operated knob.

To provide a low elevation limit of pressure, cam 293 is mounted on and operated by shaft 294. Shaft 294 also drives switch drum 295 which is part of a chaser switch assembly. Shaft 294 is driven through reduction gearing 296 by motor 297, said motor being of the reversible type such as 137 described in Figure 1. The chaser switch assembly is completed by an insulating block 298 mounted on shaft 299, said shaft 299 being adjusted by knob 300. Block 298 carries a spring switch blade 301 which engages drum 295 in a manner better shown in Figure 3.

Figure 3 is a section taken on the line 3—3 of Figure 2 and shows the construction of drum 295 and its coaction with blade 301. Drum 295 comprises a core portion of insulatng material 302, and contact sector plates 303 and 304. Each of plates 303 and 304 extend a little less than half the way around said drum, so that the ends of said plates are spaced from each other by "dead" spots 305 and 306. In the position shown, blade 301 is on dead spot 305, hence it is not contacting either blade 303 or 304. However, clockwise movement of blade 301 relative to said drum would bring said blade into contact with 303, whereas counterclockwise movement of said blade would bring it into contact with blade 304.

Motor 297 is controlled by the present chaser switch arrangement in the same manner and for the same reason as expressed in Figure 1. Clockwise rotation of knob 300 energizes motor 297 in a manner to drive cam 293 clockwise. Although knob 300 and cam 293 are in their extreme counterclockwise positions, corresponding to a minimum low elevation adjustment, it is noted that a counterclockwise adjustment of knob 300 would cause a counterclockwise adjustment of cam 293 from a higher setting. The speed of motor 297 is governed by the setting of rheostat wiper 314 which in turn is adjusted by means 320. Adjustment means 320 is shown as a screw driver adjustment, but obviously this may be an ordinary manually operated knob if desired. Ordinarily, the rheostat will be so adjusted that the motor will advance the cam and the chaser switch drum 295 at a sufficient rate to vary the low limit of cabin pressure, in terms of altitude, at a rate not exceeding a desirable limit, such as about 300 feet per minute. Because the limit of rate of pressure change may be set by statute, or by airline operating standards, it may be feasible to make the rate adjustment a more or less fixed one at the time of installation of the apparatus, hence screw driver adjustment means are preferable.

Under some circumstances, however, it is desirable to simplify the present stop arrangement and the need for rate adjustment of the low limit stop lacks importance. For instance, in an aircraft flying over ocean routes or the like and wherein landings are always at the same elevation, so that the only pressure differences existing at the landing points are those due to differences in barometric pressure, simple manually operated means for such adjustments are entirely feasible. The present manually operated means are also useful wherein the aircraft flies at high enough altitude to result in a cabin pressure, in terms of altitude as high or higher than the field at which the landing is to be made, and the adjustment for the field is made while the cabin pressure is at such a value. In Figure 4, lever 325 pivoted at 326 adjusts an integral cam means 327 for cooperation with transversely extending pin 267 of arm 265. Clockwise adjustment of arm 325 tends to shift pin 267 downwardly, and raise the minimum elevation pressure limit in the same manner that clockwise movement of knob 390 did in Figure 2, with the exception, of course, that cam 327 moves simultaneously with arm 325. Arm 330 is also pivoted at 326 and includes a concave cam surface 331 for coacting with said pin in the same manner as the aforementioned cam 290. Rotation of arm 330 in a clockwise direction increases the possible downward movement of arm 265, and raises the maximum limit of cabin pressure, in terms of elevation, whereas rotation of arm 330 in a counterclockwise direction decreases the vertical travel of pin 267 and lowers the upper pressure limit. The portions of levers 325 and 330 at the opposite ends from cam means 327 and 331, respectively, may be suitably modified to act as indicating means as noted in Figure 4.

*Operation of Figures 2 to 4*

In operation, the apparatus described in Figure 2 functions quite similarly to that in Figure 1. In this figure, as in the previous one, it may be assumed that the apparatus is in an aircraft on a field at sea level elevation. Valve 201 is operated in accordance with the signal impressed on terminals 251 and 246 of amplifier 215. If the phase of the signal impressed on said terminals is such that the phase of the output current energizing winding 208 lags that in winding 209, operation of the motor and the valve is in one direction; whereas if the signal is such that the current in winding 208 leads that in 209, operation of the motor and the valve is in the opposite direction. However, as in the previous instance, it is convenient to discuss the phase relation of the present circuit in terms of potential at a particular instant. Considered in this manner, it may be assumed that the left side of network 232 is negative and the right side positive in potential. Then, if wiper 230 and terminal 246 is positive relative to wiper 248 and terminal 251, operation of the motor will be such as to drive valve 221 in an opening direction, whereas if wiper 248 and terminal 251 are positive relative to 246 and wiper 230, operation of the motor will be such as to drive the valve in a closing direction. The relation of potential to phase is the same in this case as it was described in the operation of Figure 1.

If the aircraft should now start to rise, the pressure in the cabin, in terms of altitude, and due to the open valve 201, increases, or, otherwise stated, the absolute pressure in the cabin decreases. This causes expansion of absolute pressure responsive bellows 261 which rotate levers 249 and 255 counterclockwise. This moves wiper 248 to the right along resistor 233 and tends to make it positive relative to wiper 230. As before mentioned, this causes a signal to amplifier 251 of a sort to cause motor 206 to operate valve 201 in a closing direction and to advance wiper 230 to the right across resistor 231. However, as valve 201 is moved toward a closing position and the absolute cabin pressure increases, a differential pressure is built up between the cabin and the outside causing contraction of bellows 276. As before mentioned, contraction of bellows 276 causes an upward thrust by spring member 278 on the left end of lever 255 in a manner to oppose the expansion of bellows 261. Then, instead of bellows 261 being effective to operate wiper 248 in a manner to hold cabin pressure uniform, the contraction of bellows 276 operating through lever 255, spring 279 and the left end of lever 255 tends to operate wiper 248 in a manner to maintain a zero differential of pressure. As a result, wiper 248 moves in accordance with the resultant of the two forces so that valve 201 is operated to maintain cabin pressure about mid-way between sea level elevation and the elevation of the aircraft. While it might seem that the forces exerted by bellows 261 and 276 would tend to balance each other out and result in no movement of 249, it is noted that their forces tend to balance when the cabin pressure is about mid-way between that at sea level and at the elevation of the aircraft, as in Figure 1. At a specified altitude of the aircraft, the force exerted by, and the movement of lever 249 caused by bellows 261 varies from zero at sea level cabin pressure to a maximum at a cabin pressure corresponding to the altitude of the aircraft. Likewise, the force exerted by, and motion of 249 caused by, bellows 276 varies from a maximum with a sea level pressure in the cabin to zero when the cabin pressure corresponds to the elevation of the aircraft. As bellows 276 and 261 are equally capable of causing motion of 249 and oppose each other, the forces are in balance when lever 249 is mid-way of the adjustment that would be caused by either bellows acting alone, as in Figure 1.

As the airplane continues to rise and the cabin pressure continues to vary at half the rate of the airplane rise, bellows 261 exerts a greater force which is opposed by a greater force due to increased contraction of bellows 276 and the resulting increase of force due to greater deflection of spring 279. However, the deflection of arm 265 will eventually result in pin 267 engaging cam 290 which prevents further contraction of bellows 276 and limits the force that can be exerted by 279. With the force that can be exerted by 270 limited, any further increase in aircraft elevation, and any tendency of the aircraft cabin pressure to rise still higher, in terms of altitude, is resisted by the growing preponderance of control effort exercised by absolute pressure responsive bellows 261. Thus, by limiting the deflection of arm 265, and the force that can be exerted by spring 270, an upper limit of cabin pressure, is established.

Should, for any reason, the differential between cabin pressure and atmospheric pressure exceed a desired limit, bellows 281 contracts and moves abutment 283 to the left against the force of spring means 286. Upon abutment 283 engaging arm 249 and moving the same to the left, valve 201 is driven open and thereby permits cabin pressure to diminish and thus lower said differential pressure.

If the aircraft should now return to the field from which it took off, the cabin pressure would be varied in reverse order to that just described. However, if the aircraft is to alight at a field having a different elevation from the one previously mentioned, knob 300 is adjusted to the altitude of the new field and, operating through the chaser switch, motor 297 drives cam 293 to a position limiting the upward travel of pin 267. This insures that spring 270 will exert at least a minimum force opposing bellows 261 sufficient to prevent the cabin pressure from dropping below, in terms of elevation, the elevation of the field at which the landing is to be made. While the motor 297 operates cam 293 at a timed rate, the timed rate is of little importance if the altitude of the aircraft at the time of making the adjustment is more than twice that of the field at which the landing is to be made. However, if the altitude of the new field is more than half the elevation that the plane is flying at when the adjustment is made, it becomes apparent that the cabin pressure, in terms of altitude, must be increased for it normally is at a value half that of the aircraft elevation. Upon adjusting knob 300 to a new value, such as 5,000 feet, blade 301 engages contact sector 303 and energizes motor 297 by the circuit: battery 310, wire 316, resistor 315, wiper 314, wire 313, blade 301, sector plate 303, wire 312, motor 297, and wire 311 back to battery 310. This drives cam 293 in a clockwise direction at a timed rate until dead spot 305 engages blade 301 and contact is broken with sector plate 303. However, pin 267 may not be in engagement with the cam in the initial movement of the same. Therefore, cam 293 will have no effect on pin 267 until it advances to a position corresponding to the pressure within the cabin. From then on, however, pin 267 will be depressed and spring 270 will exert greater force at a rate depending on the speed of advancement of cam 293. As the pressure will be varied in response to this movement, the necessity for the timed rate becomes apparent. If knob 300 be rotated counterclockwise, blade 301 would contact plate 304 and motor 297 would be energized through wire 317 to drive cam 293 counterclockwise until a dead spot is reached as before.

The operation of the apparatus of Figure 2 will be precisely the same when the control means of Figure 4 is used with the exception, of course, that the lower limit of cabin pressure, in terms of altitude, will be varied immediately with adjustment of arm 325. As pointed out above, however, this is perfectly feasible providing that the aircraft flies at an elevation at least twice the height of any field at which it will alight and that the adjustment of arm 325 be made at a time when the aircraft is more than twice the elevation of the field at which it is to land. Thus, the simpler version of control shown in Figure 4 is entirely practical for many of the routes over which aircraft travels.

If it be desired to further control the rate of pressure change so that it will be less than the normal change occasioned by the ordinary operation of the apparatus, restrictor 279 may be adjusted to slow the rate of response of bellows 276 to outside atmospheric pressure. By use of capacity storage means 278 and resistor 279, the time of response of bellows 276 in changing the differential pressure can be varied at will and as the response is slowed, bellows 261 gains dominance and tends to control the pressure to a fixed value. With bellows 261 opposed by a slower movement or adjustment of spring 270, the rate of change of pressure is definitely slowed, with the previously described rate of half the airplane climb rate as an upper limit. In fact, by closing restrictor 279, the aircraft cabin pressure can be maintained at nearly uniform value by bellows 261 alone.

In the preceding descriptions, the aircraft cabin pressure has been referred to in terms of altitude, and it has been assumed that the pressure would vary in proportion to the altitude. This is not strictly true, of course, for the elevation tends to increase at a more rapid rate than the absolute pressure decreases. The present description in which cabin pressure has been referred to in terms of altitude could just as well be made entirely in terms of absolute pressure, but it appears that those who use the aircraft and work with them are accustomed to refer to cabin pressure in terms of altitude.

The present specific examples are given only to properly illustrate and describe the present invention, and are not to be considered as limiting the same to the present embodiments. It is therefore intended that the scope of the present invention be measured only by the appended claims.

I claim as my invention:

1. In a structure subject to varying atmospheric conditions, an enclosed compartment in said structure, means for supplying air to said compartment, air outlet means for said air, electrically controlled means for varying the air pressure within said compartment, means including first variable electrical impedance means for responding to absolute compartment pressure, means including second variable electrical impedance means for responding to the ratio of compartment pressure to atmospheric pressure, means including third variable electrical impedance means for responding to differential pressure in excess of a predetermined value, and electrical network means including said first, second, and third impedance means for controlling said electrically controlled means.

2. In a structure subject to varying air pressure and having a supply of air under pressure, outlet means for said air, electrically controlled means for varying the air pressure within said structure, means including first variable electrical impedance means for responding to the absolute pressure in said structure, means including second variable electrical impedance means for responding to the ratio of pressure in said structure to atmospheric pressure, and balanceable electrical network means including said first and second impedance means for controlling said electrically controlled means.

3. In an enclosed compartment subject to varying atmospheric pressure and having a supply of air under pressure, outlet means for said air, electrically controlled means for varying the air pressure within said compartment, means responsive to the ratio of compartment pressure to atmospheric pressure, electrical impedance means varied in response to said ratio responsive means, and balanceable electrical network means including said impedance means for controlling said electrically controlled means.

4. In a structure subject to varying atmospheric pressure and including an enclosed compartment in said structure furnished air under pressure, means for regulating air flow through said compartment, means for controlling said regulating means, means including an adjustable electrical impedance responsive to absolute compartment pressure, means including another adjustable electrical impedance responsive to the differential between compartment pressure and the atmospheric pressure, and means coupling said compartment pressure responsive means and said differential pressure responsive means for dependent cooperative action in adjusting said controlling means, said coupling means including a variable ratio linkage.

5. In a structure subject to varying atmospheric pressure and including an enclosed compartment supplied with air under pressure, air outlet means for said compartment, means for varying the air pressure within said compartment, adjustable means for regulating said varying means, means responsive to the absolute compartment pressure, means responsive to the differential between compartment pressure and the atmospheric pressure, adjustable flexible means coupling said compartment pressure responsive means and said differential pressure responsive means for cooperative action in adjusting said regulating means for said varying means, and time controlled means for adjusting said flexible means.

6. In control apparatus, pivoted lever means movable in response to a condition indicative of a need for operation of said apparatus, stop means for one end of said lever means, manually adjustable switch means, motor means for adjusting said stop means, and switch means adjusted by said motor means cooperating with said manually adjustable switch means for controlling said motor means.

7. In a habitable structure supplied with air under pressure and surrounded by atmospheric air under less pressure and having means for varying the air pressure within said structure, control means for said varying means comprising, in combination, one means responsive to the air pressure within said structure, other means responsive to the difference of the pressure within said structure and the amospheric pressure surrounding the structure, flexible means operatively connecting said one means and said other means, means for controllably delaying the response of said other means to changes in atmospheric pressure, adjustable stop means limiting the amount of response of said other means to differences in pressure, and means controlled by said one means and said other means for regulating said varying means.

8. In a structure supplied with air under pressure and surrounded by atmospheric air under less pressure and having means for varying the air pressure within said structure, control means for said varying means comprising, in combination, one means responsive to the air pressure within said structure, other means responsive to the difference of the pressure within said structure and the atmospheric pressure surrounding the structure, lever means jointly controlled by said one means and said other means for regulating said varying means, said lever means including a rigid portion and a resilient portion and additional means responsive to the difference of the pressure within the structure and the outside atmospheric pressure connected in operative relation to said jointly controlled means for limiting said difference in pressure to a predetermined value.

9. In control apparatus, a movable member, pivot means, first adjustable stop means for said member, said stop means including a lever carried by said pivot means and having an indicating portion and an oppositely disposed cam shaped stop portion for coacting with said member to variably limit motion in one direction, and second adjustable stop means for said member comprising a lever mounted on said pivot means and having an indicating portion at one end and cam means at its other end for adjustably limiting movement of said movable member in the opposite direction.

10. Control apparatus for a pressurized compartment comprising, in combination, means for controlling air flow through said compartment, means including a voltage dividing electrical circuit responsive to compartment pressure, means connected to said circuit and responsive to the differential between compartment pressure and atmospheric pressure, and circuit means for connecting said pressure responsive means and said differential pressure responsive means in joint controlling relation to said flow controlling means.

11. Cabin pressure control apparatus for an aircraft comprising, in combination, air flow controlling means, means responsive to the ratio of cabin pressure to the atmospheric pressure, means for connecting said ratio responsive means in controlling relation to said flow controlling means for regulating said flow controlling means in a manner to hold said ratio constant during normal flight conditions, means responsive to the absolute cabin pressure, means connecting said absolute pressure responsive means to said ratio responsive means in a manner to provide a high limit for absolute pressure in the cabin, and motor operated means for adjusting said absolute pressure responsive means at a predetermined rate.

12. Pressure control apparatus for an aircraft cabin having a pressure varying means comprising, in combination, means responsive to the ratio of cabin pressure to atmospheric pressure, means for connecting said responsive means in controlling relation to said varying means, stop means for providing an adjustable high absolute pressure limit for said control apparatus, and time controlled means for establishing an adjustable low absolute pressure limit for said control apparatus.

ALBERT E. BAAK.

(References on following page)

REFERENCES CITED

The following references are of record in the file of this patent:

UNITED STATES PATENTS

| Number | Name | Date |
|---|---|---|
| 2,208,554 | Price | July 16, 1940 |
| 2,303,081 | Krogh | Nov. 24, 1942 |
| 2,391,197 | Schwien | Dec. 18, 1945 |
| 2,396,116 | Noxon | Mar. 5, 1946 |
| 2,412,071 | Warner et al. | Dec. 3, 1946 |
| 2,413,027 | Maxson | Dec. 24, 1946 |
| 2,414,202 | Jepson et al. | Jan. 14, 1947 |
| 2,419,707 | Cooper et al. | Apr. 29, 1947 |
| 2,424,491 | Morris | July 22, 1947 |
| 2,428,283 | Kemper | Sept. 30, 1947 |
| 2,433,206 | Dube | Dec. 23, 1947 |
| 2,441,592 | Paget | May 18, 1948 |
| 2,447,918 | Teague | Aug. 24, 1948 |
| 2,450,076 | Bechberger | Sept. 28, 1948 |
| 2,450,881 | Cooper et al. | Oct. 12, 1948 |
| 2,463,487 | Widgery et al. | Mar. 1, 1949 |
| 2,549,672 | Del Mar | Apr. 17, 1951 |
| 2,549,673 | Del Mar | Apr. 17, 1951 |
| 2,549,690 | Klemperer | Apr. 17, 1951 |

FOREIGN PATENTS

| Number | Country | Date |
|---|---|---|
| 514,055 | France | Nov. 8, 1920 |
| 521,623 | Great Britain | May 27, 1940 |